United States Patent [19]

Shuff et al.

[11] 4,107,993

[45] Aug. 22, 1978

[54] METHOD AND APPARATUS FOR LEVEL MEASUREMENT USING MICROWAVES

[75] Inventors: Thomas J. Shuff, Dickinson; Robert W. Sims, Pasadena, both of Tex.

[73] Assignee: Monsanto Company, St. Louis, Mo.

[21] Appl. No.: 644,386

[22] Filed: Dec. 29, 1975

[51] Int. Cl.² ............................................ G01G 23/28
[52] U.S. Cl. ............................. 73/290 R; 324/58.5 R
[58] Field of Search .................. 73/290 R, 293, 323, 73/DIG. 11; 250/357; 325/363; 324/58.5 R, 58.5 A, 58.5 B

[56] References Cited

U.S. PATENT DOCUMENTS

| 2,611,804 | 9/1952 | Zaleski | 324/58.5 B X |
|---|---|---|---|
| 2,662,985 | 12/1953 | Good | 73/323 X |
| 3,133,191 | 5/1964 | Stone et al. | 250/357 |
| 3,447,374 | 6/1969 | Cohn et al. | 73/290 R |
| 3,713,338 | 1/1973 | Kind | 73/323 X |
| 3,809,885 | 5/1974 | Allen | 250/357 |
| 3,818,333 | 6/1974 | Walker | 324/58.5 A |
| 3,919,638 | 11/1975 | Belden, Jr. | 325/363 X |

*Primary Examiner*—S. Clement Swisher
*Attorney, Agent, or Firm*—James C. Bolding; Elizabeth F. Sporar; Paul L. Passley

[57] ABSTRACT

Microwaves are used to detect the level of a liquid in a vessel. An external chamber, constructed of a material essentially invisible to microwaves, is connected to the vessel and is open to the interior of the vessel above and below the level to be detected. Microwaves are directed through the external chamber and the unabsorbed energy of the microwaves passing through the external chamber is measured and converted to a signal representative of the liquid level in the vessel. Known electrical circuitry is used to generate the microwaves, to measure the unabsorbed microwave energy, and to convert the measured energy to a standard instrument signal representative of the liquid level in the vessel.

7 Claims, 4 Drawing Figures

METHOD AND APPARATUS FOR LEVEL MEASUREMENT USING MICROWAVES

BACKGROUND OF THE INVENTION

This invention relates to the measurement of the level of a liquid in a vessel. More particularly, this invention relates to the use of microwave energy absorption to measure the level of a liquid in a vessel. More particularly, this invention relates to the use of microwave energy absorption to indicate small changes in the level of a liquid in a vessel for control of the level.

The prior art is replete with methods for measuring the level of a liquid within a vessel using dip-sticks, floats, pressures, sonics and radioactivity. Microwaves have been restricted in use to communications, to determination of variations in dielectrics, and to determination of the moisture content of various materials. The latter usage and the present invention both utilize the principle of absorption of microwave energy by liquids. However, microwaves have not been used as a means to detect liquid level in a vessel before this invention. The use of microwaves to measure liquid level is particularly useful when it is desired to detect very small changes in the liquid level.

SUMMARY OF THE INVENTION

This invention, in one aspect, is directed to a new method of measuring the level of a liquid in a vessel through the use of microwave energy absorption. In a broad sense, microwaves of predetermined energy are passed through the vessel containing a liquid of known microwave energy absorption and the unabsorbed energy, i.e., that energy of the microwaves not absorbed by the liquid, is measured electronically and the unabsorbed energy is converted to a signal representative of the level of liquid in the vessel.

Most vessels housing liquids are made of materials and have a cross-sectional distance that is incompatible with microwave usage. Therefore, this invention in another aspect, is directed to means for simulating the liquid level in the vessel compatible with microwave usage. In a broad sense, an external chamber, similar to a normal sight gauge, is associated with the vessel. The external chamber is constructed of a material essentially invisible to microwaves and of a cross-sectional distance suitable for passing microwaves therethrough. The interior of the chamber communicates with the interior of the vessel at two points, one above and one below the liquid level, to provide a liquid level in the external chamber the same as that in the vessel. Liquids capable of absorbing microwave energy are the polar liquids. However, this invention is not restricted to determining the level of only polar liquids.

The level of a nonpolar liquid in a vessel can be measured in accordance with this invention by the addition to the vessel of a polar liquid that is of a lesser density than that of the nonpolar liquid and is immiscible with the nonpolar liquid so that an interface is between the polar and nonpolar liquid. The unabsorbed microwave energy passing through the vessel is measured and electronically converted into a signal representative of the level of the nonpolar liquid in the vessel.

DETAILED DESCRIPTION

Figure 1:
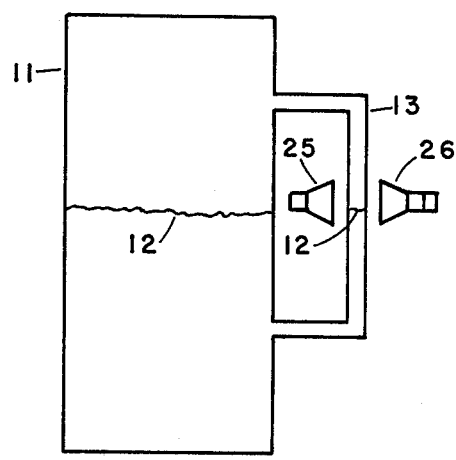
FIG. 1 is a diagram indicating the location of means associated with a vessel representing the present invention.

Referring now to FIG. 1, the location of means associated with a vessel representing the present invention is shown. A vessel 11 contains a polar liquid or two dissimilar liquids, one polar and one nonpolar, such that a liquid level or interface 12 is formed. Means to simulate said liquid level or interface 12 capable of use with microwave means is shown as an external chamber 13, comprising a hollow conduit, attached to and open to the interior of vessel 11 at two points, one above and one below the level or interface 12 to be measured, so the level or interface 12 is indicated within the external chamber 13. The external chamber 13 is fabricated from a material essentially invisible to microwaves such as glass, plastic, and Teflon. The word "invisible" as used herein is defined as penetrable without a significant loss of energy by microwaves. A first standard gain microwave horn 25 for transmitting and a second standard gain microwave horn 26 for receiving are mounted on opposite sides of the external chamber 13.

Figure 2:
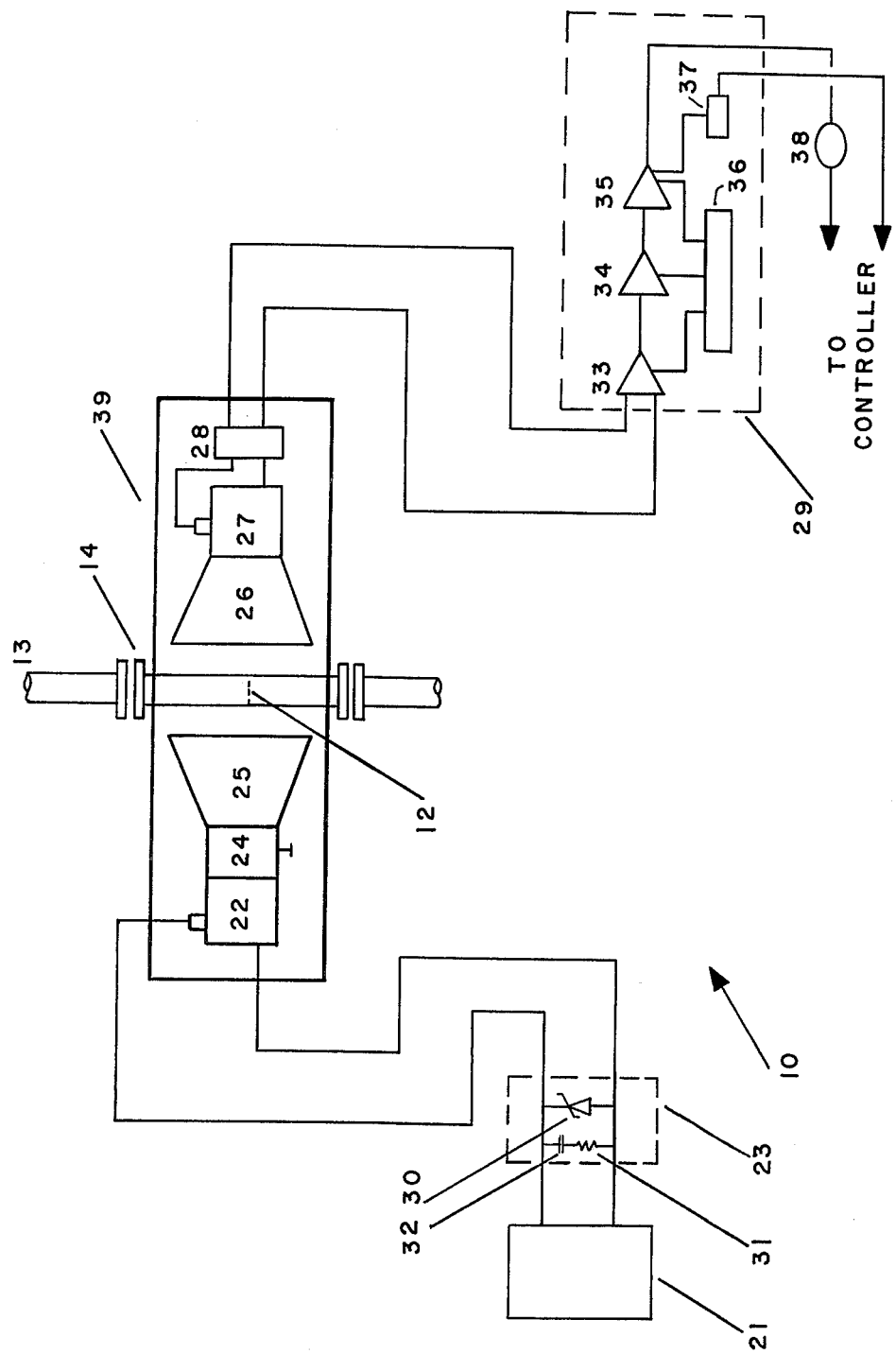
FIG. 2 is a detailed diagram of a preferred embodiment of the present invention.

Referring now to FIG. 2, a block diagram of a preferred embodiment of the present invention is shown. In a microwave level measurement system, generally designated 10, a voltage regulated power supply 21 supplies direct current (D.C.) voltage to the input of a Gunn Effect (transferred electron) Oscillator 22. An oscillator transient voltage suppression circuit 23, comprising a Zener diode 30 connected in parallel with a series connected resistor 31 and capacitor 32, is connected from the positive bias terminal of the Gunn Effect Oscillator 22 to the ground terminal. The Zener diode 30 is chosen to limit the voltage input to the Gunn Effect Oscillator 22 to the required oscillator excitation voltage and the time constant of the series connected resistor 31 and capacitor 32 smooths transients in the supply voltage.

When the external chamber 13 is fabricated from a material not essentially invisible to microwaves, an insert 14 of length sufficient to detect the variations of liquid level, fabricated from a material essentially invisible to microwaves, is installed in external chamber 13. The output of the Gunn Effect Oscillator 22 is electromagnetic radiation of a predetermined frequency in the microwave region which is attenuated in a waveguide level set attenuator 24 and is directed toward the level or interface 12 in the external chamber 13 or insert 14 by a transmitting first standard gain microwave horn 25. A second standard gain microwave horn 26 receives the unabsorbed microwave energy passing through the liquid within said external chamber 13 or insert 14. Said first and second standard gain microwave horns 25 and 26 are used to collimate and direct the microwaves and to provide a good load termination by matching impedences. Said second standard gain microwave horn 26 directs said unabsorbed microwave energy toward a crystal diode detector 27 with a matched square law load 28 where said electromagnetic waves are detected, rectified, and formed to a perfect square law response throughout the level or interface 12 measurement range. The output signal from said square law load 28 is the input to an electronics unit 29 comprising a voltage follower 33, an interstage amplifier 34, a voltage to current converter 35, and two power supplies, a ±15 V.D.C. regulated power supply 36 and a ±30 V.D.C. unregulated power supply 37. The output from said voltage to current converter 35 is any standard electronic instrument signal, such as 10 to 50 milliamps D.C., that is used for both indication of the level or interface 12 height on a meter 38 and the input to a level control instrument. Said Gunn Effect Oscillator 22, waveguide level set attenuator 24, first and second standard gain microwave horns 25 and 26, crystal diode detector 27, square law load 28, and the portion of the external chamber 13 or insert 14 located between said first and second standard gain microwave horns 25 and 26 are mounted within a thermally insulated enclosure 39.

Figure 3:
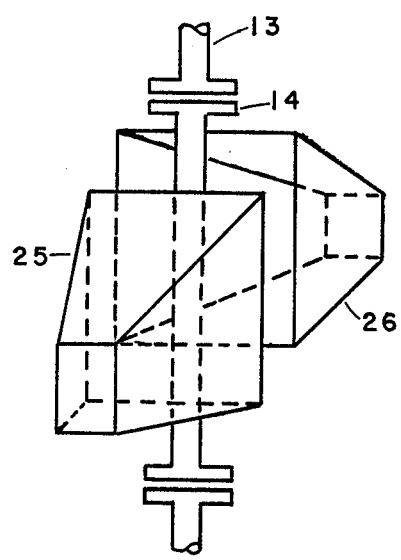
FIG. 3 is a diagram showing the relative size and mounting positions of the transmitting and receiving standard gain microwave horns.

Referring now to FIG. 3, the relative size of said first and second standard gain microwave horns 25 and 26 and said external chamber 13 or insert 14 is shown. The widths of the first and second standard gain microwave horns 25 and 26 are equal. The width of insert 14 is less than the width of either of the first and second standard gain microwave horns 25 and 26. If said insert 14 were wider, this invention would become unworkable because the measurement would become sensitive to changes in density of the polar liquid as well as changes in height of the liquid.

The basis of this invention is that changes in the height of the level or interface 12 will cause measurable changes in the absorption of the microwave energy. The microwave frequency and the diameter of the external chamber 13 or insert 14 are chosen to provide maximum absorption of the microwave energy by the polar liquid present. The maximum diameter of the external chamber 13 or insert 14 to provide a measurable change in the absorption of the microwave energy is less than the diameter at which standing waves are formed.

Optimum results are achieved with the present invention when the microwave frequency is one between three gigahertz ($3 \times 10^9$ Hertz) and 16.8 gigahertz ($16.8 \times 10^9$ Hertz) and the internal diameter of the external chamber 13 or insert 14 is limited to a maximum of one-half inch (0.5 inch). When the internal diameter of the external chamber 13 or insert 14 is greater than one-half inch, inaccuracies in the measurement are introduced because the rate of absorption of the microwave energy begins to vary with changes in concentration of the polar liquid as well as with changes in height of the level of interface 12 and because standing waves are produced within the external chamber 13 or insert 14. If a frequency less than three gigahertz ($3 \times 10^9$ Hertz) is used the size of the microwave means becomes prohibitively large and unwieldy. Inaccuracies in the measurement are also introduced by variations in ambient temperature; thus the Gunn Effect Oscillator 22, the waveguide level set attenuator 24, the first and second standard gain microwave horns 25 and 26, the crystal diode detector 27, the matched square law load 28, and the portion of the external chamber 13 or insert 14 positioned between the first and second standard gain microwave horns 25 and 26 are mounted within a thermally insulated enclosure 39 as shown in FIG. 2.

Figure 4:
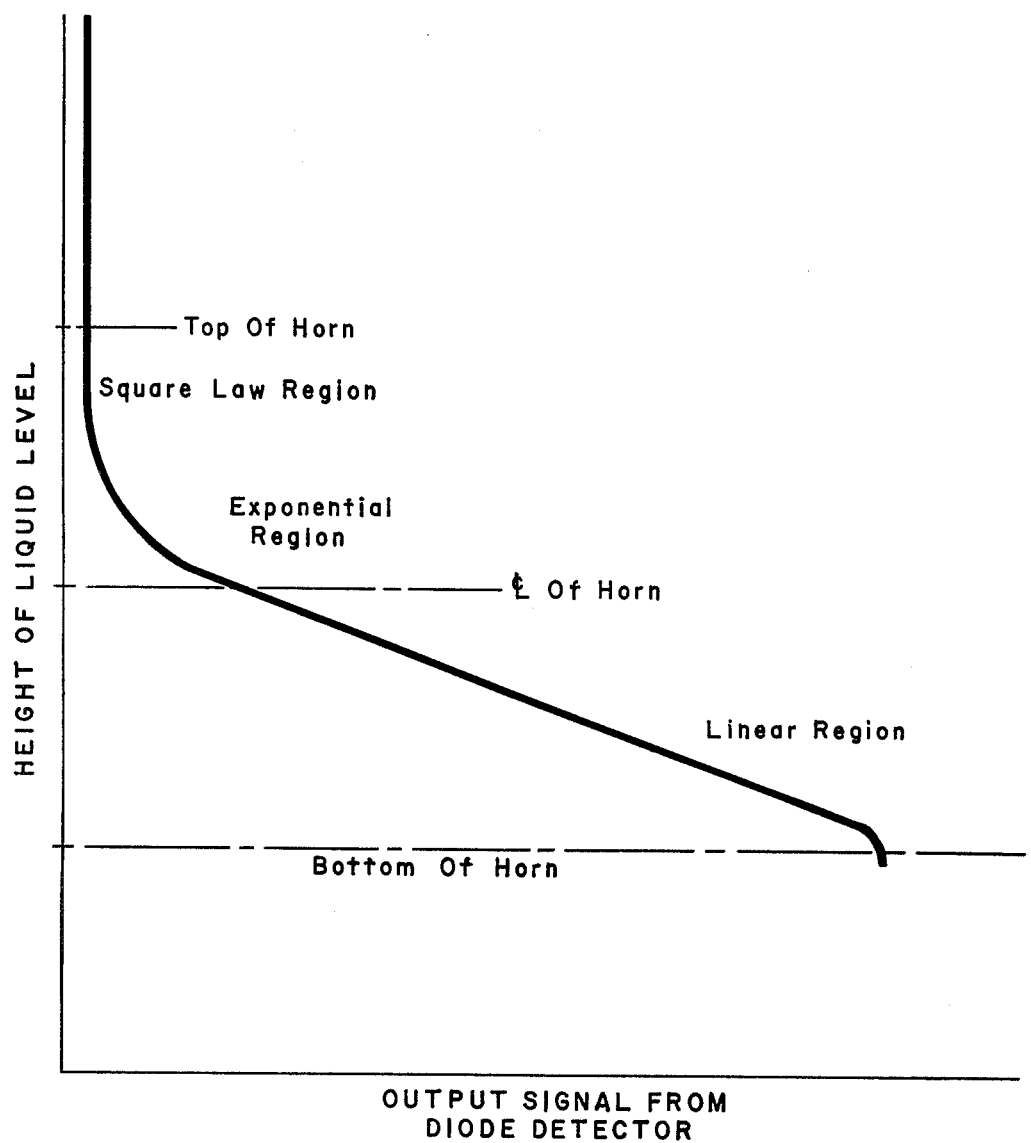
FIG. 4 is a diagram of a typical response curve of the present invention.

Referring now to FIG. 4, a typical response curve for the present invention is shown. The region of linear response to changes in the height of the level or interface 12 is limited to the lower one-half of the first and second standard gain microwave horns 25 and 26 which are used to direct the microwaves. Extremely large first and second standard gain horns 25 and 26 become too unwieldy. to use; thus, the horn size is limited to approximately eighteen inches in height and the corresponding level measurement range is limited to approximately 9 inches with a microwave frequency of three gigahertz ($3 \times 10^9$ Hertz).

EXAMPLE

This invention is used to measure the level of propionic acid in a vessel using a microwave frequency of 10.525 gigahertz ($10.525 \times 10^9$ Hertz) and using apparatus as shown in FIG. 2. A glass insert with a diameter of 0.375 inch is used in the external chamber. Standard gain microwave horns with a height of 7 inches are used. As the liquid level in the vessel is varied, the instrument signal from the voltage to current converter varies in an amount corresponding to the variations in liquid level. The linear measurement range in this example is 3.5 inches, one-half the height of the standard gain microwave horns, and the corresponding output signal from the voltage to current converter is 10 to 50 milliamps.

The following indicates the correspondence of the measurements of this invention to precise sight measurements for various heights of the liquid level within the the vessel.

| Level | Sight Measurement | | Microwave Measurement | |
|---|---|---|---|---|
|  | Reading | % of Level | Reading | % of Level |
| 1 | 1.0" | 28.6 | 21.4 MA | 28.5 |
| 2 | 2.0" | 57.2 | 33.2 MA | 57.5 |
| 3 | 1.5" | 42.9 | 27.2 MA | 43.0 |
| 4 | 3.0" | 85.7 | 44.4 MA | 86 |
| 5 | 3.5" | 100 | 50 MA | 100 |

In additional tests wherein the diameter of the glass insert in the external chamber is 0.75 inch, when the liquid level and density is changed, the level indicated by the means of this invention deviates from the precise sight measurements by 1.2%. Such inaccurate indication of the liquid level is caused by changes in the absorbing properties of the liquid as its density is changed and by standing waves which form within the liquid in the glass insert.

The use of this invention offers the advantage of being able to accurately know liquid levels in vessels in inaccessible locations and to have a continuous indication of level changes in the vessels.

Another utility of the invention is its ability to accurately meter or control precise quantities of liquids.

Another advantage of this invention is that the liquid being measured is not required to be in contact, as a sample or the like, with the instrumentation and thus is not subject to problems of corrosion from the material being measured as are other known instrument measurement systems.

Additional advantages of this invention are that it can be installed upon existing gauge glasses, it does not remove a sample from the process, and it is extremely sensitive to small changes in liquid level.

As various changes could be made in the construction herein described without departing from the scope of the invention, it is intended that all matter contained in the above description shall be interpreted as illustrative and not in a limiting sense.

We claim:

1. The method of continuously indicating the level of a liquid in a vessel comprising: generating microwaves, directing the microwaves through said vessel, measuring the unabsorbed microwave energy, and determining the level of the liquid from said unabsorbed microwave energy.

2. The method of continuously indicating the level of a liquid in a vessel comprising: simulating the level of liquid in the vessel in a means essentially invisible to microwaves having a cross-section of one-half inch or less attached to said vessel, generating microwaves, directing the microwaves through said simulator means, measuring the unabsorbed microwave energy, and determining the level of the liquid from said unabsorbed microwave energy.

3. The method of continuously indicating the level of a nonpolar liquid in a vesel comprising: creating a liquid-liquid interface by addition of a less dense polar liquid immiscible in the nonpolar liquid, simulating the interface level in the vessel in a means essentially invisible to microwaves having a cross-section of one-half inch or less attached to the vessel, generating microwaves, directing the microwaves through the similator means, measuring the unabsorbed microwave energy, and determining the level of the nonpolar liquid from the unabsorbed microwave energy.

4. The method of claim 1 in which said generated microwaves are of a frequency between 3 gigahertz ($3 \times 10^9$ Hertz) and 16.8 gigahertz ($16.8 \times 10^9$ Hertz).

5. The method of claim 2 wherein said liquid is propionic acid, said means for simulating the level is constructed of glass with a diameter of 0.375 inch, and the microwave frequency is 10.525 gigahertz ($10.525 \times 10^9$ Hertz).

6. An apparatus for continuously indicating the level of a liquid comprising, in combination: a vessel containing said liquid, means essentially invisible to microwaves having a cross-section of one-half inch or less attached to said vessel wherein the level of said liquid is simulated, a microwave generator and means for directing the propagation of the microwaves through said simulator means, means for measuring the unabsorbed microwave energy passing through said simulator means, and means for determining the level of the liquid from said unabsorbed microwave energy.

7. Apparatus in accordance with claim 6 in which said microwave generator is an oscillator for generating microwaves of a predetermined frequency in the microwave region chosen for optimum absorption by the liquid.

* * * * *